US011200565B2

(12) United States Patent
Chen

(10) Patent No.: US 11,200,565 B2
(45) Date of Patent: Dec. 14, 2021

(54) LOW COST METHOD AND SYSTEM TO ENABLE AN UNATTENDED DEVICE TO ACCEPT CARD PRESENT TRANSACTIONS

(71) Applicant: Visa International Service Association, San Francisco, CA (US)

(72) Inventor: Yuexi Chen, Foster City, CA (US)

(73) Assignee: VISA INTERNATIONAL SERVICE ASSOCIATION, San Francisco, CA (US)

(*) Notice: Subject to any disclaimer, the term of this patent is extended or adjusted under 35 U.S.C. 154(b) by 0 days.

(21) Appl. No.: 16/730,813

(22) Filed: Dec. 30, 2019

(65) Prior Publication Data

US 2021/0201297 A1 Jul. 1, 2021

(51) Int. Cl.
*G06Q 20/36* (2012.01)
*G06Q 20/40* (2012.01)
*G06Q 20/34* (2012.01)
*G06Q 20/32* (2012.01)

(52) U.S. Cl.
CPC ......... *G06Q 20/367* (2013.01); *G06Q 20/327* (2013.01); *G06Q 20/352* (2013.01); *G06Q 20/401* (2013.01)

(58) Field of Classification Search
None
See application file for complete search history.

(56) References Cited

U.S. PATENT DOCUMENTS

| | | | |
|---|---|---|---|
| 8,352,323 B2 | 1/2013 | Fisher | |
| 8,589,300 B2 | 11/2013 | Hammad | |
| 10,719,833 B2 | 7/2020 | Patel | |
| 10,789,587 B2 | 9/2020 | Bellenger | |
| 2014/0143155 A1 | 5/2014 | Karlov | |
| 2015/0060542 A1* | 3/2015 | Sagady | G06Q 20/352 235/381 |
| 2019/0248325 A1* | 8/2019 | Schmidt | B60R 25/1003 |
| 2019/0332828 A1* | 10/2019 | Ostri | G06Q 20/352 |
| 2021/0107579 A1* | 4/2021 | Adam | B62H 3/00 |

OTHER PUBLICATIONS

International Search Report and Written Opinion for PCT/US2020/065114 dated Mar. 19, 2021; 11 pages.

* cited by examiner

*Primary Examiner* — Namrata Boveja
*Assistant Examiner* — Amit Patel
(74) *Attorney, Agent, or Firm* — Schwabe Williamson & Wyatt, PC

(57) ABSTRACT

Enabling an unattended device to accept card present transactions comprises establishing short-range wireless communication between the unattended device and an application on a mobile device of a cardholder. The unattended device includes a card reader and wireless interface. The unattended device receives a transaction amount for a transaction between the cardholder and the unattended device. The card reader on the unattended device reads account information from a payment card of the cardholder presented to the card reader. The unattended device encrypts the account information and the transaction amount to generate encrypted transaction data. The unattended device transmits the encrypted transaction data to the application on the mobile device using the short-range wireless communication for forwarding to a payment processing network using a network link of the mobile device. The unattended device receives an authorization response forwarded to the unattended device by the application from the payment processing network.

11 Claims, 6 Drawing Sheets

20

20A-1   20A-2

20B   20C   20D

LOW COST METHOD AND SYSTEM TO ENABLE AN UNATTENDED DEVICE TO ACCEPT CARD PRESENT TRANSACTIONS

BACKGROUND

Brick and mortar stores are equipped with point of sale (POS) terminals to conduct payment card transactions with customers or cardholders. POS terminals are typically attended by a clerk who rings up the merchandise and supervises the transactions. To accept payment cards, POS terminals require supporting infrastructure that must be provided by the merchants. Such infrastructure typically requires for each FOS, a screen to display a sales amount and display instructions/prompts, a secure keypad, called a PIN pad, to enable cardholders to enter their PINs, and a card reader to capture account information from the payments cards. In addition, the merchant must supply a broadband network connection in each store to enable all of the POS terminals to submit payment transactions to a remote payment network for authorization.

The infrastructure above is not well suited for merchants that may have non-fixed locations or who sell merchandise/services using unattended devices, such as micromobility vehicles (electric scooters, electric skateboards, shared bicycles and electric pedal assisted (pedelec) bicycles), vending machines, parking meters, storage lockers, and the like. To enable such unattended devices to accept payment cards is cost prohibitive. For example, to enable each unattended device to accept payment cards would require retrofitting each device with a screen, a keypad, a wireless network link, and a SIM card, which can cost up to approximately $500 per device. In addition, the merchant would have to pay for a 4G wireless subscription that might cost an extra $10 per device, which for a national service could involve thousands of devices.

Rather than pay such a steep cost, some merchants of unattended devices have enabled consumers to make credit card payments using an application on the user's phone. Users first must download a payment application (app), typically provided by the merchant, create an account, and then provide payment account information that the app stores. Once the app has stored the payment account information, the user uses the app to begin a service with one of the devices (e.g., a scooter), and the transaction is authorized through the payment app. This process requires some technological understanding by the users, and in addition, not all consumers like to have their payment account information stored with various merchants. For example, consumers may have multiple cards from different issuers and the cards may be used anywhere the cards are accepted. In the case where a user has a banking or wallet app on their phone, there is no extra step that the user has to take, such as installing a new application, registering themselves and inputting account information. In other words, pay by phone schemes create friction on the user experience. To increase payment card adoption, particularly contactless card adoption, card processors and issuer banks would prefer simple card solutions where a user can visit any merchant that accepts the card and complete a payment transaction by taking only one action—presenting the card to a card reader.

Accordingly, it is desirable to provide a low cost method and system for enabling an unattended device to accept card present transactions.

BRIEF SUMMARY

The disclosed embodiments provides methods and systems for enabling an unattended device to accept a contactless payment. Aspects of disclosed embodiments include establishing short-range wireless communication between the unattended device and an application on a mobile device of a cardholder, where, the unattended device includes a card reader and wireless interface. The unattended device receives a transaction amount for a transaction between the cardholder and the unattended device. The card reader on the unattended device reads account information from a payment card of the cardholder presented to the card reader. The unattended device encrypts the account information and the transaction amount to generate encrypted transaction data. The unattended device transmits the encrypted transaction data to the application on the mobile device using the short-range wireless communication for forwarding to a payment processing network using a network link of the mobile device. The unattended device receives an authorization response forwarded to the unattended device by the application from the payment processing network.

According to the method and system disclosed herein, by providing the unattended device with a simple card reader and a short range wireless interface, and by leveraging the existing network link of the mobile device, the disclosed embodiments provide a low cost method of enabling the unattended device to accept payment cards in the same manner as done in brick and mortar stores. No user registration or typing in of card information is necessary, thus reducing friction on the user experience in order to increase the adoption of payment cards, particularly for contactless payment cards.

DETAILED DESCRIPTION

Figure 1A:
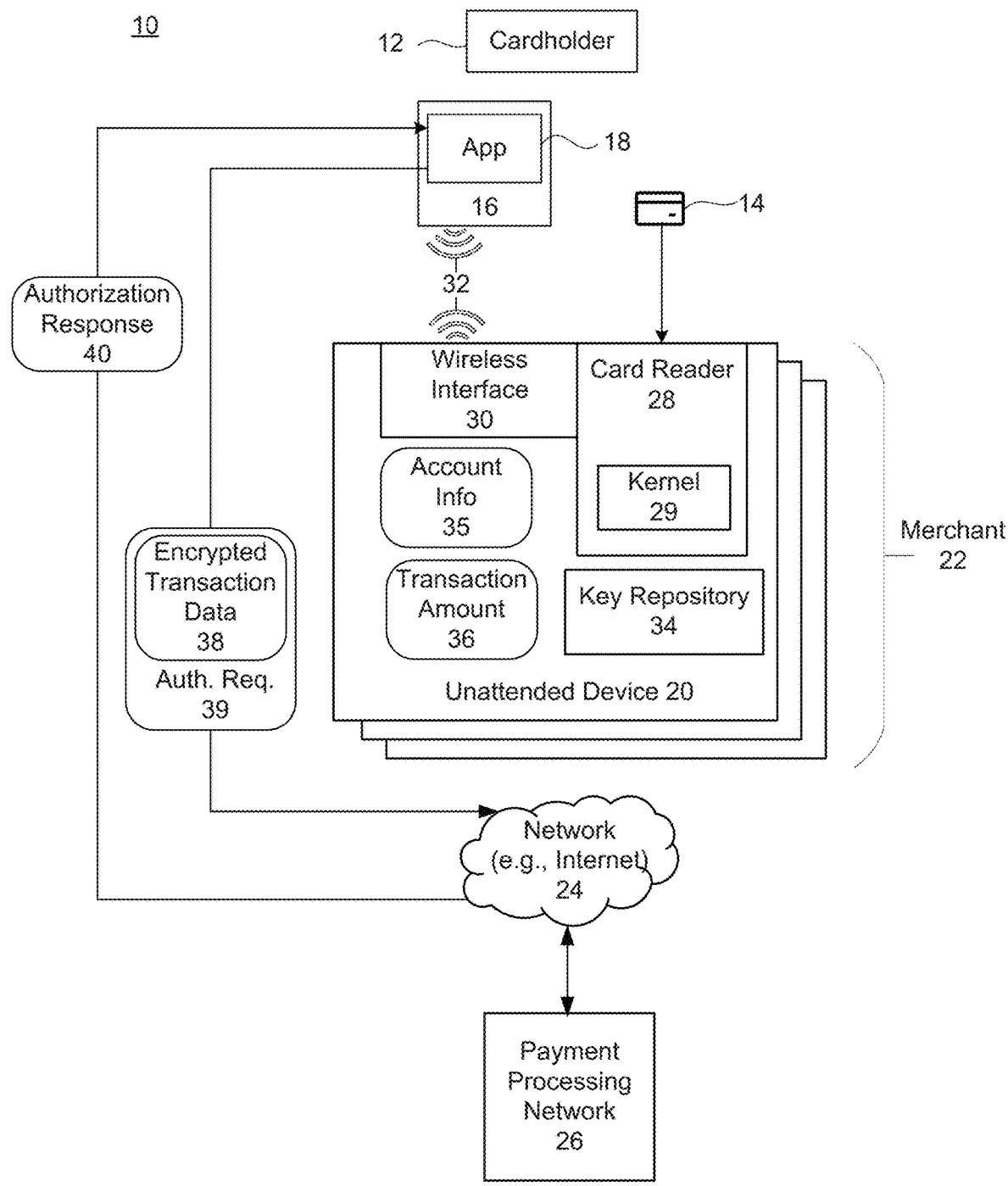
FIG. 1A is a block diagram illustrating a payment system that enables an unattended device to accept card present transactions.

The disclosed embodiments relate to methods and systems for enabling an unattended device to accept card present transactions. The following description is presented to enable one of ordinary skill in the art to make and use the invention and is provided in the context of a patent application and its requirements. Various modifications to the exemplary embodiments and the generic principles and features described herein will be readily apparent. The exemplary embodiments are mainly described in terms of particular methods and systems provided in particular implementations. However, the methods and systems will operate effectively in other implementations. Phrases such as "exemplary embodiment", "one embodiment" and "another embodiment" may refer to the same or different embodiments. The embodiments will be described with respect to systems and/or devices having certain components. However, the systems and/or devices may include more or less components than those shown, and variations in the arrangement and type of the components may be made without departing from the scope of the invention. The exemplary embodiments will also be described in the context of particular methods having certain steps. However, the method and system operate effectively for other methods having different and/or additional steps and steps in different orders that are not inconsistent with the exemplary embodiments. Thus, the present invention is not intended to be limited to the embodiments shown, but is to be accorded the widest scope consistent with the principles and features described herein.

The disclosed embodiments provide a low cost method of enabling unattended devices to accept payment cards without being retrofitted with the expensive POS equipment. Instead of adding the POS equipment, the disclosed embodiments propose adding only a card reader running a kernel, and a short-range wireless communication interface to the unattended devices. No screen, pin-pad or network link is required, resulting in significantly reduced expense. A wallet application on a cardholder's mobile device (e.g., a smartphone) is configured to establish a short-range connection (e.g., BLE, Wi-Fi) between the smartphone and the card reader to leverage the pre-existing network link of the mobile device of the user. The wallet app may display the transaction amount and prompts the user to present (e.g., swipe, tap/dip) the payment card at the payment symbol on the unattended device. After the contactless reader reads and encrypts the account information from the card and the payment amount, the encrypted transaction information is sent back to smartphone, which then relays the encrypted transaction information to a remote payment processing server. To the extent the user has a banking, issuer or wallet app preinstalled on their phone, the disclosed embodiments provide a low cost method of enabling unattended devices to accept payment cards in the same manner as done in brick and mortar stores—by the user simply presenting the cards to the unattended devices. No user registration or typing in of card information is necessary.

FIG. 1A is a block diagram illustrating a payment system that enables an unattended device to accept card present transactions. The payment system 10 includes a cardholder 12 who is purchasing merchandise or services from an unattended device 20 of a merchant 22. The cardholder 12 uses a payment card 14 and a mobile device 16 (e.g. smartphone) running a wallet application (app) 18 to conduct transactions, such as payment transactions. In some non-limiting embodiments, a mobile device may include an electronic device configured to communicate with one or more networks such as, but not limited to, a portable computer (e.g., a tablet), a cellular phone, a smartphone, a wearable device (e.g., watches, glasses, lenses, clothing, and the like), or other like devices. Using a network link of the mobile device, the wallet application 18 can communication over a public or private network 24, such as the Internet, with a payment processing network 26.

The cardholder 12 is a user who is authorized to conduct transactions with the payment account provided by an issuer. The cardholder 12 can be, for example, the account owner of the account associated with the payment card 14, or an individual who is authorized to use the account on behalf of the account owner. The terms "cardholder" and "user" may be used interchangeably in the following description. The cardholder 12 initiates a transaction for goods/services of the merchant 22 using the payment card 14 associated with the payment account.

The merchant 22 refers to one or more entities (e.g., operators of retail businesses) that provide goods and/or services, and/or access to goods and/or services, to the user, based on a transaction, such as a payment transaction. As used herein, "merchant" may further refer to one or more computer systems operated by or on behalf of a merchant, such as a server executing one or more software applications. In the disclosed embodiments, the merchants 22 that may sell goods or services in non-fixed locations or using one or more unattended devices 20.

Figure 1B:
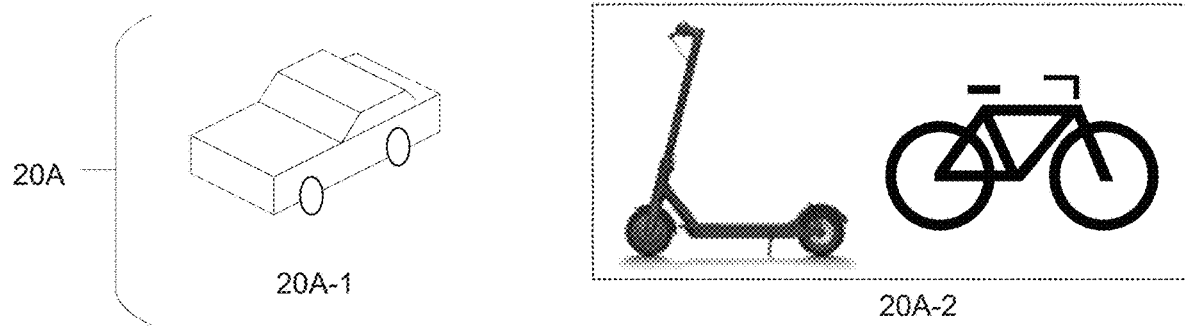
FIG. 1B shows several types of unattended devices that may be used by the merchant.
Figure 1B:
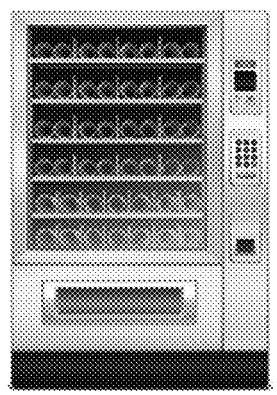
Figure 1B:
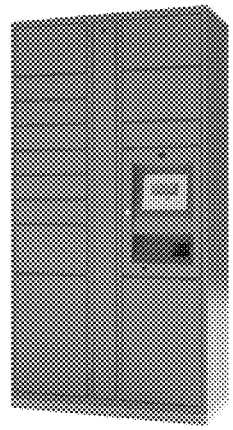
Figure 1B:
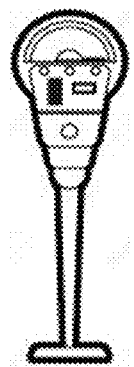

FIG. 1B shows several types of unattended devices 20 that may be used by the merchant 22. As used herein the term "unattended device" refers to any type of device that controls access to goods or services by a user without assistance by an operator. Example types of unattended devices 20 may include vehicles 20A, vending machines 20B, lockers 20C, parking meters 20D, and the like. Examples of types of vehicles 20A may include traditional rental vehicles 20A-1, such as cars, boats and the like, and micromobility vehicles 20A-2, such as electric scooters, electric skateboards, shared bicycles and electric pedal assisted (pedelec) bicycles. Vending machines 20B may sell consumables (e.g., beverages, food, drugs) or merchandise, while the lockers 20C may be used by merchants 22 to store consumables or merchandise for pickup by the cardholder 12. Parking meters 20D refer to devices used to collect money in exchange for the right to park a vehicle in a particular place for a limited amount of time.

According to the disclosed embodiments, a low cost method of enabling the unattended devices 20 to accept payment cards is provided without being retrofitted with the expensive POS equipment, such as a screen, a keypad, a wireless network link (e.g., a cellular link), and a SIM card, which can cost up to approximately $500 per device in addition to a monthly wireless subscription.

According to the disclosed embodiments, the one or more unattended devices 20 are provided with a card reader 28, a wireless interface 30, a kernel 29 and a key repository 34. No screen, pin-pad or network link is required, resulting in significantly reduced expense of approximately less than $20 per device.

As used herein, the term payment card 14 refers to any magnetic stripe card or chip card (also referred to as a Smart card) that is used during a card present transaction. The payment card 14 may comprise a physical instrument containing an account identifier associated with an account used for conducting transactions. For example, an issuer institution may provide an account identifier, such as a primary account number (PAN), to a customer that uniquely identifies one or more accounts associated with that customer. Examples of a payment card 14 include any type of products for contact, contactless capable and dual interface secure cards whether a credit card, debit card, charge card, gift card, loyalty card, payroll card, healthcare card membership card, or any combination thereof. In one embodiment, the term payment card 14 excludes an electronic device used to conduct transactions, such as a mobile phone, containing account information. The payment card 14, however, may include a volatile or a non-volatile memory to store information (e.g., an account identifier, a name of the account holder, and/or the like).

On chip card standard is called EMV (Europay, Mastercard, and Visa). EMV cards are smart cards (also called chip cards, integrated circuit cards, or IC cards) that have an antenna and store their data on integrated circuit chips, in addition to magnetic stripes (for backward compatibility). EMV cards include cards that must be physically inserted (or "dipped") into a reader, as well as contactless cards that can be read over a short distance to enable consumers to wave or "tap" their card, fob, or handheld device over a contactless card.

Whether a magnetic stripe card or chip card, a "card present transaction" refers to a transaction in which a cardholder uses the card to interact physically with a payment system, such as POS terminal. The interaction can include swiping a card with a magnetic strip, inserting a card with an EMV chip (referred to as "dipping"), waving a card over a reader (referred to as "tapping). Card present transactions using contact and contactless payments are made in close physical proximity to the card reader, unlike mobile payments, which use broad-area cellular networks and do not involve close physical proximity. Any transaction manually keyed into a credit card machine does not count as a card present transaction, even when the card is physically present. In order to qualify as a card present transaction, the card reader 28 must capture electronic data stored on the card.

The card reader 28 may comprise an electronic sensor that reads a magnetic strip or bar code on the payment card, or an electronic device that reads and transfers data from a memory storage device of the payment card 14. In the embodiment, the card reader may include a contact-based receiver or a contactless-based receiver to read the payment card 14. Examples of a contactless-based receiver may include a Bluetooth® communication receiver, a near-field communication (NFC) receiver, a radio frequency identification (RFID) receiver, and/or other contactless transceivers or receivers.

In one embodiment, the card reader 28 includes a processor that executes the kernel 29. The kernel 29 encrypts account information 35 from the payment card 14 and a transaction amount 36 to generate encrypted transaction data 38. As used herein the kernel 29 may comprise an existing kernel 29 of an operating system of the card reader 28, where the kernel 29 is modified to communication with the wallet application 18 and to generate the encrypted transaction data 38 using one or more secret keys stored in the key repository 34. In another embodiment, the kernel 29 may be executed on a processor of the unattended device 20 outside of the card reader 28.

In one embodiment, the key repository 34 comprises a non-transitory computer-readable medium, such as a computer memory, that stores one or more secret keys. As used herein, the secret (or cryptography) key is a string of data (a parameter) that determines the functional output of a cryptographic algorithm. For encryption algorithms, the secret key specifies the transformation of plaintext into ciphertext or transformations in other cryptographic algorithms, such as digital signature schemes and message authentication codes. In one embodiment, the key repository 34 may store one or more secret keys having one of the following properties: symmetric, public or private. The secret keys may also be grouped into pairs that have one private and one public key, which is referred to as an asymmetric key pair. In embodiments, the secret key may be compatible with standards such as the Digital Signature Standard (DSS), the Digital Signature Algorithm (DSA), or RSA (Rivest-Shamir-Adleman) signatures. In one embodiment, cryptographic algorithms corresponding to the secret key may be executed by the kernel 29 in the card reader 28 or by another process.

The wireless interface 30 is a network card that establishes short-range wireless communication 32 with the mobile device 16 of the cardholder 12 in a protocol support by both sides. Short-range wireless communication uses signals that travel from a few centimeters to several meters. Examples of short-range wireless communication include Bluetooth®, ZigBee®, and in some instances Wi-Fi, and the like.

The wallet app 18 running on a cardholder's mobile device 16 is configured to establish a short-range connection (e.g., Bluetooth®, ZigBee®) between the mobile device 16 and the card reader 28 to leverage the preexisting network link of the mobile device 16. The wallet app 18 may display the transaction amount 36 and prompts the user to present (e.g., swipe, tap/dip) the payment card 14 to the reader 28. After the card reader 28 reads and encrypts the transaction amount 36 and account information 35, the encrypted transaction data 38 is sent back to mobile device 16 over the wireless interface 30. The wallet app 18 establishes communication with the payment processing network 26 via the network 24 over a cellular or Wi-Fi link and relays the encrypted transaction data 38 in an authorization request 39 to the payment processing network 26.

The network 24 may comprise a private network or a public network, such as the Internet. As used herein, the terms "communication" and "communicate" may refer to the reception, receipt, transmission, transfer, provision, and/or the like of information (e.g., data, signals, messages, instructions, commands, and/or the like). For one unit (e.g., a device, a system, a component of a device or system, combinations thereof, and/or the like) to be in communication with another unit means that the one unit is able to directly or indirectly receive information from and/or send (e.g., transmit) information to the other unit. This may refer to a direct or indirect connection that is wired and/or wireless in nature. Additionally, two units may be in communication with each other even though the information transmitted may be modified, processed, relayed, and/or routed between the first and second unit. For example, a first unit may be in communication with a second unit even though the first unit passively receives information and does not actively send information to the second unit. As another example, a first unit may be in communication with a second unit if at least one intermediary unit (e.g., a third unit located between the first unit and the second unit) processes information received from the first unit and sends the processed information to the second unit. In some non-limiting embodiments, a request or message may refer to a network packet (e.g., a data packet and/or the like) that includes data.

The authorization request 39 is an electronic message that is sent to request authorization for a transaction. The authorization request 39 can be sent, for example, to the payment processing network 26 and/or to an issuer (not shown) of the payment card 14. The authorization request 39 may comply with (International Organization of Standardization) ISO 8583, which is a standard for systems that exchange electronic transaction information associated with a payment made by a consumer using a payment device or payment account. The authorization request 39 may include an issuer account identifier that may be associated with the payment card 14 or payment account. The authorization request 39 may also comprise additional data elements corresponding to "identification information" including, by way of example only: a service code, a CVV (card verification value), a dCVV (dynamic card verification value), an expiration date, etc. The authorization request 39 may also comprise "transaction information," including any information associated with a current transaction, such as the transaction amount, merchant identifier, merchant location, etc., as well as any other information that may be utilized in determining whether to identify and/or authorize a transaction.

The payment processing network 26 may refer to an entity that receives the authorization request 39 from the merchant 22 and other entities and provides guarantees of payment, in some cases through an agreement between a transaction service provider and an issuer. The payment processing network 26 may include one or more computer systems, processors or servers executing one or more software applications. The processors may be organized into data processing subsystems, networks, and operations used to support and deliver payment related services (e.g., authentication services, authorization services, exception file services, and clearing and settlement services, etc.). Examples of a payment processing network may include an open payment network such as Visa®, MasterCard®, American Express®; a closed network, such as a merchant network; or any other entity that processes credit card transactions, debit card transactions, and other types of commercial transactions.

The payment processing network 26 returns an authorization response 40 to the wallet application 18 on the mobile device 16 of the cardholder 12 indicating whether the cardholder 12 is authorized to perform the given payment transaction. The authorization response 40 may be an electronic message reply to the authorization request 39. The authorization response 40 may include, by way of example only, one or more of the following status indicators: Approval—transaction was approved; Decline—transaction was not approved; or Call Center—response pending more information, merchant must call the toll-free authorization phone number.

The disclosed embodiments leverage the pre-existing network link of the mobile device 16 of the cardholder 12 to provide a low cost method of enabling unattended devices 20 to accept payment cards 14 in the same manner as done in brick and mortar stores 20. No user registration or typing in of card information is necessary.

Figure 2:
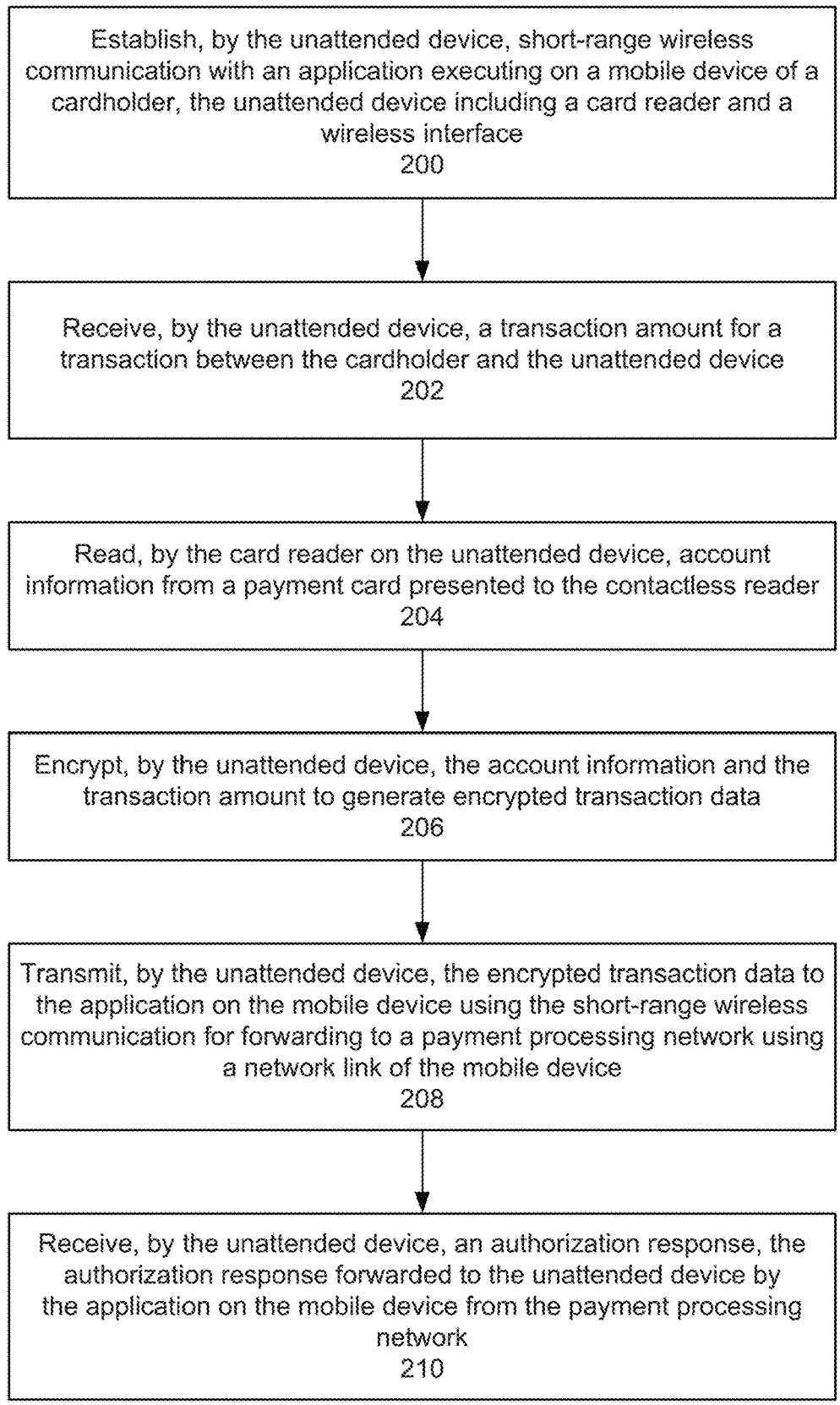
FIG. 2 is a flow diagram illustrating a process to enable an unattended device to accept card present transactions.

FIG. 2 is a flow diagram illustrating a process to enable an unattended device to accept card present transactions. In one example embodiment, some process operations may be performed by the kernel 29 (or other software) executing in the unattended device 20. The process may include the unattended device 20 establishing short-range wireless communication 32 with the wallet app 18 executing on the mobile device 16 of the cardholder 12, where the unattended device is equipped with a card reader and a wireless-interface (block 200). In one embodiment, the short-range wireless communication is established between the wireless interface 30 of the unattended device 20 and a corresponding interface (e.g., Bluetooth®) on the mobile device 16. The short-range wireless communication 32 may be initiated by either the wireless interface 30 or the mobile device 16.

The unattended device 20 receives a transaction amount for a transaction between the cardholder and the unattended device (block 202). In one embodiment, depending on the type of goods/services offered by the unattended device 20, the unattended device 20 (e.g., the kernel 29) may receive the transaction amount 36 by determining or calculating the transaction amount 36. For a rental bike, for example, the kernel 29 may perform a table lookup to determine the transaction amount 36 based on the amount of time the bike is rented by the cardholder. As another example, the kernel 29 may calculate the transaction amount 36 by multiplying the amount of time by a rate (e.g., per minute, hourly, etc.). In another embodiment, the unattended device 20 may receive the transaction amount 36 from the wallet app 18. In this embodiment, the wallet app 18 may determine the transaction amount 36 either through a table lookup, a calculation, or via communication with a server of the merchant 22 using the network link of the mobile device 16.

The card reader 28 of the unattended device 20 reads the account information 35 from the payment card 14 presented to the card reader 28 by the cardholder 12 (block 204). In one embodiment, the card reader 28 may be implemented as a contactless card reader and the payment card 14 may be implemented as a contactless payment card such that the cardholder 12 user waves, taps or dips the contactless payment card over/in the contactless card reader.

The unattended device 20 encrypts the account information 35 and the transaction amount 36 to generate encrypted transaction data 38 (block 206). In one embodiment, the account information 35 and the transaction amount 36 are encrypted by the kernel 29 using secret keys stored in the key repository 34.

The unattended device 20 transmits the encrypted transaction data 38 to the wallet app 18 on the mobile device 16 using the short-range wireless communication 32 for forwarding to the payment processing network 26 using a network link of the mobile device (block 208).

The unattended device 20 then receives an authorization response 40, where the authorization response 40 is forwarded to the unattended device 20 by the wallet app 18 on the mobile device 16 from the payment processing network 26 (block 210). In some embodiments, the unattended device 20 receives from the payment processing network 26 or from the merchant system additional merchant instructions, such an unlock code, which may be included in the authorization response 40 or sent in a separate message. Responsive to the authorization response 40 indicating that the transaction is approved, and the unattended device 20 delivers, enables, or otherwise allows access to, the goods/services purchased by the cardholder 12.

Figure 3A:
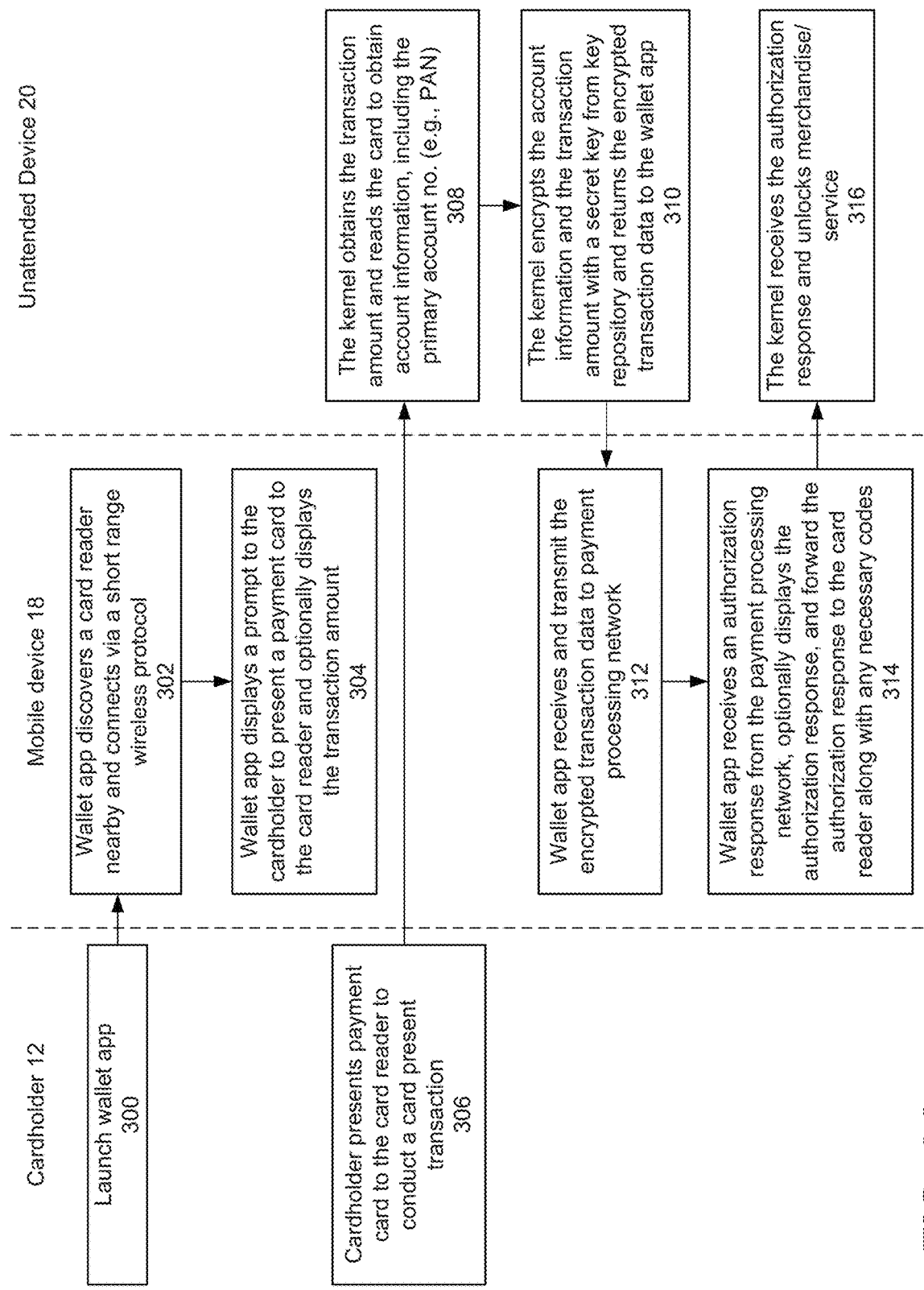
FIG. 3A is a block diagram illustrating the system and process to enable an unattended device to accept card present transactions in further detail.

FIG. 3A is a block diagram illustrating the system and process to enable an unattended device to accept card present transactions in further detail. Referring to FIGS. 1 and 3A, the process may begin by the cardholder 12 launching or opening the wallet app 18 on the mobile device 16 when approaching the unattended device 20 to make a card present transaction with the unattended device 20 (block 300).

In one embodiment, the wallet app 18 discovers the card reader 28 nearby (e.g., installed on a bike, self-checkout counter, parking meter and the like) and uses the mobile device 16 to connect with the wireless interface 30 of the unattended device 20 via a short-range wireless protocol (block 302). In one embodiment, the wallet app 18 or the mobile device 16 may display discovered Bluetooth devices in the vicinity for user selection. In another embodiment, the discovery may be performed by the cardholder 12 user the wallet app 18 to scan a QR code displayed on unattended device 20 or card reader 28 to enable the wallet app 18 to read a NFC tag on an EMV-type card reader.

The wallet app 18 may display a prompt for the cardholder 12 to present payment card 14 to the card reader 28 and may optionally display the transaction amount 36 (block 304). In one embodiment, the prompt to present payment card 14 may include instructions to swipe, tap or dip the payment card 14 in/over/on the card reader 28. In one embodiment, the card reader 28 may respond by lighting a "ready to read" LED indicator.

The wallet app 18 may also display other types of messages. For example, for a vending machine, the wallet app 18 may display a user interface where the cardholder 12 can select a vending item number. For a rental vehicle or parking meter, the wallet app 18 may let the cardholder select a rental period. Besides the transaction amount, the wallet app 18 may display a designation or ID of the unattended device 20 or a location of the unattended device 20. It should be understood that the prompts displayed to the user on the mobile device 16 may be replaced or augmented with audio/visual prompts. In another embodiment, for some applications where the card reader has a screen, one or more of the prompts to the cardholder 12 may be displayed on the screen of the card reader 28.

Figure 3B:
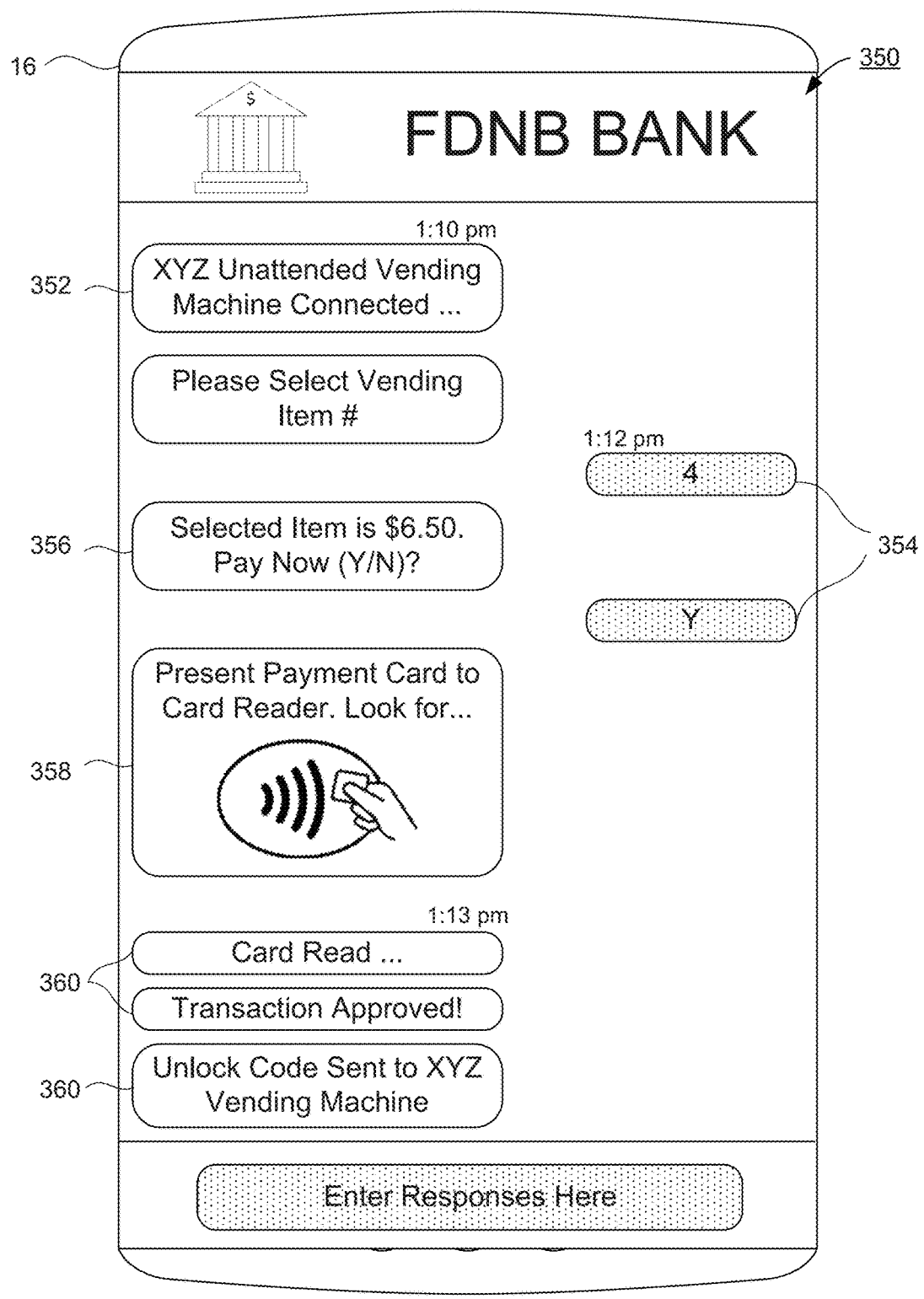
FIG. 3B is a diagram illustrating an example of a wallet application screen displayed on the mobile device to the cardholder to conduct a card present transaction.

FIG. 3B is a diagram illustrating an example of a wallet application screen 350 displayed on the mobile device 16 to the cardholder 12 to enter a card present transaction. In the example shown, the card present transaction screen 350 is displayed by a wallet app 18 (FIG. 1) of the merchant 22 or an issuer (e.g., FDNB Bank). A wallet app, also referred to as an "digital wallet," "electronic wallet," and "electronic wallet mobile application," is a software application configured to facilitate and/or conduct transactions. The wallet app 18 may display and transmit account identifiers or representations of the account identifiers (e.g., tokens), on behalf of accounts of the cardholder 12 to facilitate payments at more than one unrelated merchant, perform person-to-person payments, or load financial value into the digital wallet. In one embodiment, the merchant or issuer may make the electronic wallet available to cardholders 12. In another embodiment, a third party may provide the electronic wallet. Examples of third-party electronic wallets may include, but are not limited to, Google Wallet™, Android Pay®, Apple Pay®, and Samsung Pay®.

In the example shown, the card present transaction screen 350 is shown where the user is performing transaction with a vending machine. The user interface (UI) is implemented as a chat interface for purposes of illustration, where messages from the wallet app 18 are displayed on the left-hand side of the UI. Other user interfaces are also suitable. The card present transaction screen 350 may begin with a prompt 352 informing the cardholder 12 that an unattended machine has been connected. Another prompt requests the cardholder 12 to select a vending item #. User response messages 354 are shown on the right-hand side of the UI. In this example, the cardholder 12 has entered item "4". The UI then displays a prompt 356 showing the transaction amount and a request for the cardholder 12 to confirm payment of the transaction by, for example, entering Y (yes) or N (no). The cardholder 12 responds by entering a "Y" for yes. The wallet app 18 then displays a prompt 358 instructing the cardholder 12 to present the payment card 14 to the card reader 28 where a contactless card symbol is displayed.

Referring again to FIG. 3A, in response to the prompt to the cardholder 12 to present the payment card, the cardholder 12 presents the payment card 14 to the card reader 28 to conduct the card present transaction by swiping or tapping/dipping the payment card (block 306). The kernel 29 obtains the transaction amount 36 and reads the payment card 14 to obtain the account information 35, such as the primary account no. (e.g., PAN) (block 308). The kernel 29 encrypts the account information 35 and the transaction amount with a secret key from key repository 34 and returns the encrypted transaction data 38 to the wallet app 18 via the short-range wireless communication 32 (block 310).

The wallet app 18 sends the encrypted transaction data 38 to the payment processing network 26 using the network link of the mobile device (block 312). In one embodiment, the wallet app 18 may send the encrypted transaction data 38 to the payment processing network 26 using an additional security layer such as SSL (Secure Sockets Layer) or VPN (virtual private network). The payment processing network 26 completes the transaction with an acquirer and/or an issuer as required, and transmits the authorization response 40.

The wallet app 18 receives the authorization response 40 from payment processing network 26, displays at least a portion of the authorization response, and forwards the authorization response 40 to the card reader 28 along with any necessary codes (block 314). The kernel 29 receives the authorization response 40 and unlocks the merchandise/service (block 316). During this process, neither the unattended device 20 or the wallet app 18 stores any of the cardholder's account information or the transaction data.

Referring again to FIG. 3B, after the card reader 28 reads the payment card 14 and sends the encrypted transaction data 38 to the wallet app 18, the wallet app 18 display prompts 360 informing the cardholder 12 that the card was read and that the transaction was approved. Also shown is a prompt informing the cardholder 12 that an unlock code was sent to the vending machine. The cardholder 12 is then given access to the selected item #4.

By providing the unattended device 20 with a simple card reader and a short range wireless interface, and by leveraging the existing cellular or Wi-Fi network link of the mobile device, the disclosed embodiments provide a low cost method of enabling the unattended device 20 to accept payment cards in the same manner as done in brick and mortar stores—by the user simply presenting the cards to the unattended devices. No user registration or typing in of card information is necessary, reducing friction on the user experience in order to increase the adoption of payment cards, particularly for contactless payment cards.

Figure 4:
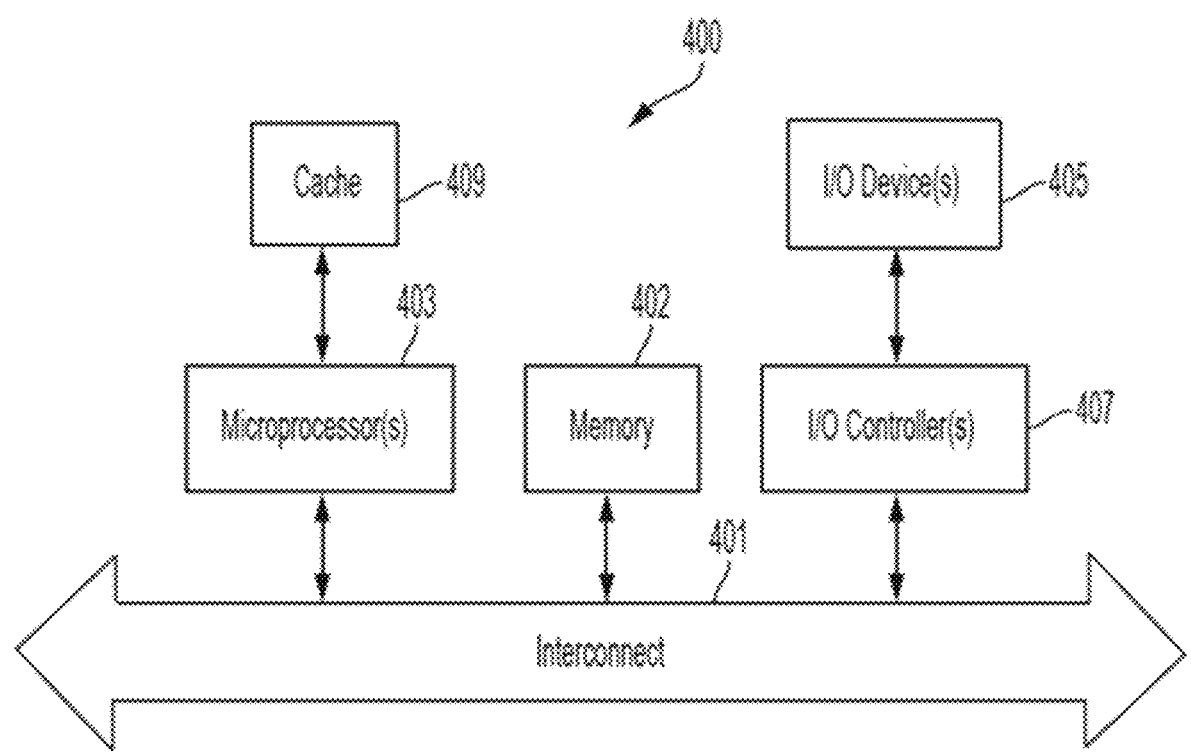
FIG. 4 shows an implementation of a computer system that may be applicable to the mobile device, the card reader, the unattended device and the payment processing network.

FIG. 4 shows an implementation of a computer system 400 that may be applicable to the mobile device 16, the card reader 28, the unattended device 20 and the payment processing network 26. According to an embodiment. The computer system 400 can include a microprocessor(s) 403 and memory 402. In an embodiment, the microprocessor(s) 403 and memory 402 can be connected by an interconnect 401 (e.g., bus and system core logic). In addition, the microprocessor 403 can be coupled to cache memory 409. In an embodiment, the interconnect 401 can connect the microprocessor(s) 403 and the memory 402 to input/output (I/O) device(s) 405 via I/O controller(s) 407. I/O devices 405 can include a display device and/or peripheral devices, such as mice, keyboards, modems, network interfaces, printers, scanners, video cameras and other devices known in the art. In an embodiment, (e.g., when the data processing system is a server system) some of the I/O devices (405), such as printers, scanners, mice, and/or keyboards, can be optional.

In an embodiment, the interconnect 401 can include one or more buses connected to one another through various bridges, controllers and/or adapters. In one embodiment, the I/O controllers 407 can include a USB (Universal Serial Bus) adapter for controlling USB peripherals, and/or an IEEE-1394 bus adapter for controlling IEEE-1394 peripherals.

In an embodiment, the memory 402 can include one or more of: ROM (Read Only Memory), volatile RAM (Random Access Memory), and non-volatile memory, such as hard drive, flash memory, etc. Volatile RAM is typically implemented as dynamic RAM (DRAM) which requires power continually in order to refresh or maintain the data in the memory. Non-volatile memory is typically a magnetic hard drive, a magnetic optical drive, an optical drive (e.g., a DV D RAM), or other type of memory system which maintains data even after power is removed from the system. The non-volatile memory may also be a random access memory.

The non-volatile memory can be a local device coupled directly to the rest of the components in the data processing system. A non-volatile memory that is remote from the system, such as a network storage device coupled to the data processing system through a network interface such as a modem or Ethernet interface, can also be used.

In this description, some functions and operations are described as being performed by or caused by software code to simplify description. However, such expressions are also used to specify that the functions result from execution of the code/instructions by a processor, such as a microprocessor.

Alternatively, or in combination, the functions and operations as described here can be implemented using special purpose circuitry, with or without software instructions, such as using Application-Specific Integrated Circuit (ASIC) or Field-Programmable Gate Array (FPGA). Embodiments can be implemented using hardwired circuitry without software instructions, or in combination with software instructions. Thus, the techniques are limited neither to any specific combination of hardware circuitry and software, nor to any particular source for the instructions executed by the data processing system.

While one embodiment can be implemented in fully functioning computers and computer systems, various embodiments are capable of being distributed as a computing product in a variety of forms and are capable of being applied regardless of the particular type of machine or computer-readable media used to actually effect the distribution.

At least some aspects disclosed can be embodied, at least in part, in software. That is, the techniques may be carried out in a computer system or other data processing system in response to its processor, such as a microprocessor, executing sequences of instructions contained in a memory, such as ROM, volatile RAM, non-volatile memory, cache or a remote storage device.

Routines executed to implement the embodiments may be implemented as part of an operating system or a specific application, component, program, object, module or sequence of instructions referred to as "computer programs." The computer programs typically include one or more instructions set at various times in various memory and storage devices in a computer, and that, when read and executed by one or more processors in a computer, cause the computer to perform operations necessary to execute elements involving the various aspects.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of the present disclosure.

A method and system for enabling an unattended device to accept card present transactions has been disclosed. The present invention has been described in accordance with the embodiments shown, and there could be variations to the embodiments, and any variations would be within the spirit and scope of the present invention. Accordingly, many modifications may be made by one of ordinary skill in the art without departing from the spirit and scope of the appended claims.

I claim:

1. A computer-implemented method of enabling an unattended device to accept card present transactions, comprising:
  establishing, by the unattended device, short-range wireless communication with a mobile device of a cardholder, wherein the mobile device executes an application, and the unattended device is equipped with a card reader and a short-range wireless interface;
  receiving, by the unattended device over the short-range wireless communication, a transaction amount from the application for a transaction between the cardholder and the unattended device, the application determining the transaction amount through one of: a table lookup, a calculation, or via communication with a server using a network link of the mobile device;
  reading, by the card reader on the unattended device, account information from a payment card of the cardholder presented to the card reader;
  encrypting, by the unattended device, the account information and the transaction amount to generate encrypted transaction data;
  transmitting, by the unattended device, the encrypted transaction data to the application on the mobile device using the short-range wireless communication;
  forwarding, by the application, the encrypted transaction data to a payment processing network using a network link of the mobile device;
  receiving, by the application, an authorization response from the payment processing network, and forwarding the authorization response to the unattended device via the short range wireless communications; and
  receiving, by the unattended device, the authorization response.

2. The computer-implemented method of claim 1, wherein receiving the authorization response further comprises: receiving, by the unattended device, additional instructions.

3. The computer-implemented method of claim 1, further comprising: responsive to the authorization response indicating that the transaction is approved, delivering, enabling, or allowing access to, by the unattended device, a good or a service purchased by the cardholder.

4. The computer-implemented method of claim 1, wherein receiving, by the unattended device, the transaction amount further comprises: determining the transaction amount by performing a table lookup.

5. The computer-implemented method of claim 1, wherein receiving, by the unattended device, the transaction amount further comprises: calculating the transaction amount.

6. The computer-implemented method of claim 1, further comprising implementing the card reader as a contactless card reader and the payment card as a contactless payment card.

7. The computer-implemented method of claim 1, wherein encrypting, by the unattended device, the account information and the transaction amount to generate the encrypted transaction data further comprises: encrypting the account information and the transaction amount by a kernel using secret keys stored in the key repository.

8. An unattended device, comprising:
  a short-range wireless interface;
  a contactless card reader; and a kernel executed by the contactless card reader, the kernel configured to:
  establish, by the short-range wireless interface, short-range wireless communication with a wallet application executing on a mobile device of a cardholder;
receive a transaction amount over the short-range wireless communication from the application for a transaction between the cardholder and the unattended device, the wallet application determining the transaction amount through one of: a table lookup, a calculation, or via communication with a server using a network link of the mobile device;
read, by the contactless card reader, account information from a contactless payment card of the cardholder;
encrypt, using a secret key, the account information and the transaction amount to generate encrypted transaction data;
transmit, by the wireless interface, the encrypted transaction data to the wallet application on the mobile device using the short-range wireless communication, wherein the wallet application: i) forwards the encrypted transaction data to a payment processing network using a network link of the mobile device, i) receives an authorization response from the payment processing network, and iii) forwards the authorization response to the unattended device via the short range wireless communications of the mobile device;
receive, using the short-range wireless communication, the authorization response forwarded by the wallet application from the payment processing network; and
responsive to the authorization response indicating that the transaction is approved, causing the unattended device to deliver, enable, or allow access to, a good or a service purchased by the cardholder.

9. The unattended device of claim 8, wherein responsive to the authorization response, the kernel receives additional merchant instructions.

10. The unattended device of claim 8, wherein the unattended device receives the transaction amount by performing a table lookup.

11. The unattended device of claim 8, wherein the unattended device receives the transaction amount by calculating the transaction amount.

* * * * *